Patented Dec. 23, 1941

2,267,269

UNITED STATES PATENT OFFICE 2,267,269

RECOVERY OF ORGANIC ACIDS BY DISTILLATION

Harold C. Cheetham and David A. Rothrock, Philadelphia, Pa., assignors to The Resinous Products & Chemical Company, Philadelphia, Pa.

No Drawing. Application May 18, 1940, Serial No. 336,058

5 Claims. (Cl. 202—57)

This invention relates to a process for recovering useful compositions from the waste products obtained in the manufacture of sebacic acid from castor oil or other esters or salts of ricinoleic acid. It also relates to the non-volatile acid residue which is obtained from the waste products.

Sebacic acid is made commercially by fusing castor oil with caustic alkali, or (as described in U. S. Patent 2,182,056) by heating the two in the presence of water under high pressure. The initial reaction products are octanol-2, methyl hexyl ketone, the sodium salt of sabacic acid, and the sodium salts of various acids formed by side reactions. The octanol-2 and methyl hexyl ketone are removed by distillation, and the acids formed by side reactions by dissolving the residue in water and adjusting the pH to about 6 by means of mineral acid, such as sulphuric acid. This causes the formation of two layers, a lower aqueous layer and an upper oily layer. The lower layer, which is an aqueous solution of sodium sebacate, is drawn off and further acidified to precipitate the sebacic acid. The upper oily layer contains the acids formed by side reactions. In the description of the invention that follows and in the claims the term "by-product acids" is used to designate the mixture of acids that forms this oily layer. It has a very dark color, is difficult to separate by distillation or other common methods, and has heretofore been considered wholly lacking in any commercial utility. For this reason it was discarded as a waste product.

It has now been found, however, that these by-product acids may be separated into a mixture of monocarboxylic acids, resembling stearic acid, and a mixture of polycarboxylic acid, having an equivalent weight substantially three and one-half times that of sebacic acid, by first acidifying the by-product acids, then drying the mixture, and finally distilling under reduced pressure.

While these by-product acids are not easily separated by distillation processes, it has been found if they are first acidified a separation by distillation is practical. The acid treatment, it is believed, breaks any emulsified water in the by-product acids, decomposes traces of alkali soaps, and converts any lactones present to acids. Any strong inorganic acid, such as sulphuric, hydrochloric, phosphoric, or nitric may be used in this step. A wide range of concentrations of acid is permissible, but for purposes of economy and effectiveness, concentrations of 2% to 20% are preferred. After the by-product acids and inorganic acid have been thoroughly mixed, and heated if desired, the mixture is allowed to stand, whereby the by-product acids again separate from the aqueous acid layer. The by-product acids may, if desired, be washed with water to remove traces of inorganic acid and then dried by heating them while stirring. A separate drying step is not, however, essential, as removal of the last traces of water may be performed as the first step in the distillation.

Distillation of the by-product acids is performed at low pressures. The first distillate contains any water or octanol-2 which may have been left in the by-product acids. There are then obtained volatile fatty acid materials which boil at still temperatures between 100° C. and about 270° C. at from 4–20 mm. pressure. It is preferable that the more volatile of these fatty acid materials be taken off as a first fraction at pot temperatures up to 200° C. and pressures of from 10–20 mm. This first fraction usually amounts to from 0.5 to 5% of the dried by-product acids. It has an acid number between 235 and 255, an iodine number of 35–52, and a color number of 3–5 on the paint and varnish scale. After this fraction has been removed, the temperature may be raised and the pressure further reduced if desirable. At temperatures between 200° C. and 270° C. and pressures from 4–20 mm. a distillate which constitutes from 30–40% of the total by-product acids is obtained. This fraction has an acid number of 200–230, usually 212–219, and an iodine number of 35–45. Its color is usually about 3 on the paint and varnish scale. It resembles stearic acid in general properties, but is softer in texture and has a higher iodine number, indicating the presence of unsaturated acids, such as oleic, and 10,11-undecylenic, etc. These acids are useful in making soaps, as modifiers for resins, and as ingredients in compositions where the usual fatty acids are employed.

The residue which remains after heating to 270° C. at 4 mm. pressure is a dark, amber-colored, clear, viscous composition having an acid number between extremes of 140 and 165, with usual limits of 150 and 160, and an iodine number between 45 and 60, being on the average about 50. This residue constitutes from 50–70% of the by-product acids. The exact nature of the residue is not definitely known but it has been found to be composed primarily of long chain polycarboxylic acids. It reacts with polyhydric alcohols to form resinous materials of unique character. These resinous materials are being made the subject matter of a separate patent application, Serial No. 336,059 filed May 18, 1940.

As illustrative of how the invention may be practiced, the following examples are given:

*Example 1.*—1000 g. of by-product acids was stirred gently with 1000 ml. of water to which has been added 60 g. of sulfuric acid. The temperature of the mixture was raised to 80° C. Stirring was discontinued and after the two layers formed, the aqueous layer was removed. Hot water was then added, the mixture stirred, and the water layer again removed. The oily material was then heated to over 100° C. with stirring to drive off trapped or emulsified water. The dried, oily material amounted to about 700 g.

This oil was run into a vacuum still and subjected to vacuum distillation. Between 100° C. and 200° C. at 10 mm. pressure about 20 g. of an oil was taken off. Between 200° C. and 275° C. at 10 mm. pressure 245 g. of distillate was obtained. The residue amounted to 410 g.

The acid number of the fraction obtained between 200° C. and 270° C. was 219; the iodine number was 41. The acid number of the residue was 156; the iodine number was 56. The viscosity of a 70% solution of the residue in toluene was E on the Gardner-Holdt scale.

*Example 2.*—About 700 pounds of the wet by-product acids was treated in a vat with a hot 6% solution of sulfuric acid. After the mixture had been stirred two hours, layers were permitted to form, and the aqueous layer drawn off. The oil was then washed with hot water and the water carefully drawn off. The oil was then heated with a high pressure steam coil and stirred to drive off the remaining water. About 500 lbs. of oil remained. This was charged into a 100 gal. vacuum still. A fraction of 29 pounds was taken off between 100 and 200° C. at 10 mm. pressure. Most of this fraction was distilled at a vapor temperature of 180 to 200° C. this fraction had an acid number of 249, an iodine number of 36.1, and a color of 5+. Heating was continued until a pot temperature of 289° C. was reached. A second fraction amounting to 172 pounds was obtained. This fraction had an acid number of 210, an iodine number of 42.7, and a color of 3+. The residue amounted to 282 pounds. It had an acid number of 150 and an iodine number of 52.8. A 70% solution in toluene had a viscosity of F.

We claim:

1. The method of recovering useful compositions from the by-product acids obtained in the manufacture of sebacic acid from castor oil, which comprises washing the by-product acids with a dilute solution of a strong inorganic acid, drying the washed product, and subjecting it to vacuum distillation to yield a volatile portion and a residue which does not distill at 270° C. and 4 mm. pressure.

2. The method of recovering useful compositions from the by-product acids obtained in the manufacture of sebacic acid from castor oil, which comprises washing the by-product acids with a dilute solution of a strong, inorganic acid, separating an aqueous layer and an oily layer, and subjecting the oily material to vacuum distillation until there is obtained a volatile portion and a residue which is essentially non-volatile at 270° C. and 4 mm. pressure.

3. The method of recovering useful compositions from the by-product acids obtained in the manufacture of sebacic acid from a member of the group consisting of ricinoleic acid and its esters and salts which comprises washing the by-product acids with an aqueous solution of a strong, inorganic acid, separating the by-product acids from the aqueous solution and subjecting them to vacuum distillation to yield volatile oily material and a residue which does not distill at 270° C. and 4 mm. pressure.

4. The method of recovering useful compositions from the by-product acids obtained in the manufacture of sebacic acid from castor oil, which comprises washing the by-product acids with a dilute solution of sulfuric acid, washing and drying the washed oily material, and separating it by vacuum distillation into a volatile portion and a residue which does not distil at about 270° C. and 4 mm. pressure.

5. As a new composition of matter, the residue obtained from the vacuum distillation of acidified by-product acids obtained in the manufacture of sebacic acid from a member of the group consisting of ricinoleic acid and its esters and salts, said residue being essentially non-volatile at 270° C. and 4 mm. pressure, having an acid number between 140 and 165, and having an iodine number between 45 and 60, and being clear, amber-colored and viscous, and composed primarily of long chain polycarboxylic acids.

HAROLD C. CHEETHAM.
DAVID A. ROTHROCK.